Figure 1:
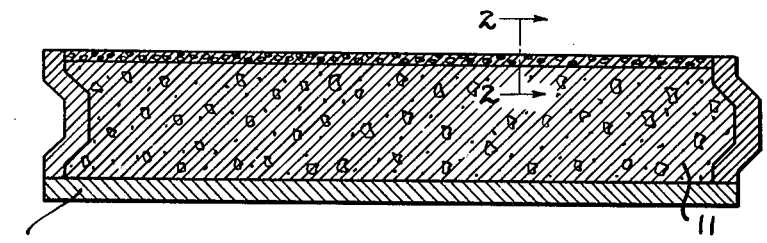

Sept. 3, 1940.  W. O. BRASSERT  2,213,687
CONCRETE WALL MEMBER
Filed March 3, 1938

Inventor,
Walter O. Brassert,
BY Minturn & Minturn,
Attorneys.

Patented Sept. 3, 1940

2,213,687

UNITED STATES PATENT OFFICE 2,213,687

CONCRETE WALL MEMBER

Walter O. Brassert, Bloomfield, Ind.

Application March 3, 1938, Serial No. 193,668

1 Claim. (Cl. 72—6)

This invention relates to building wall members and particularly to a silo wall member, made of concrete, or cement and some suitable aggregate. When the wall member is to be employed in a silo, it is exposed to a wide range of temperature changes, and its interior face is subjected to the acids of the ensilage. It has been the experience that where the face portion of the concrete wall member is made in the usual manner, deterioration sets in due to the acid reactions in the wall member causing the surface of that member to be etched away.

For the purpose of structural strength and economy, the concrete wall member is made of cement as a binder and aggregate such as gravel, crushed rock or the like, and this etching action is particularly noted about the aggregate particles.

Heretofore in order to overcome this difficulty, the surface portions of the wall member have been coated with some sort of an acid repellant or acid resistant material so as to withhold the acids from contact with the wall member. This mode of treatment works entirely satisfactorily as long as the material may be held in contact with the wall member. It sometimes occurs, however, particularly in cold weather, that the coating material will contract and loosen or chip off. If it were economical and structurally sound so to do, the wall member could be made out of cement alone without an aggregate combined therewith and such a wall member would be very resistant to the action of the acids of the ensilage. The acids would tend to permeate the zone of the wall member immediately adjacent the inner or face surface but this penetration would become negligible in very short order due to the fact that, what little reaction may occur, soon becomes stopped on account of the fact that the salts produced will clog up the minute pores of the cement and in themselves form a good acid seal. Since in this case there is no aggregate present, there would be no loosening effect as between the cement bond and the aggregate to set up the chipping or etching action resulting in the customary spalling of the wall member. However, as above indicated, it is neither practical nor economical to make the wall member solely of cement and, therefore, the cement and aggregate concrete must be protected in some manner.

It is a primary object of my invention to provide a protective zone adjacent the face of the wall member which is normally presented toward the ensilage, and to create such a zone as will become permanent in nature as an acid resisting medium as well as a medium preventing any appreciable degree of acid penetration. It is a further primary object of my invention to provide as a structural part of the wall member rather than as an after application, an acid resistant film to be incorporated directly within the concrete and to be so sealed therewithin as to prevent loss of that material due to weather conditions or temperature changes.

Figure 3:
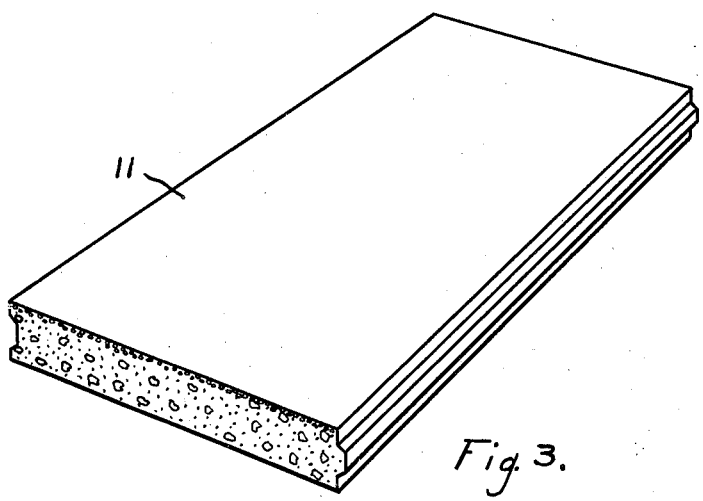
Figure 2:
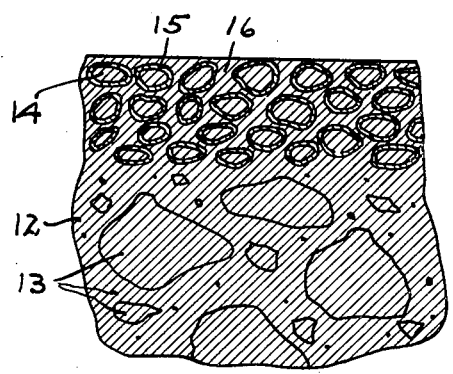

These and many other objects and advantages of the invention will become apparent to those versed in the art in the following description of one particular form of the invention as is illustrated more or less diagrammatically in the accompanying drawing, in which Fig. 1 is a vertical section through a wall member within a mold;

Fig. 2, a detail on a greatly enlarged scale of a section through the inner face portion of the wall member on the line 2—2 in Fig. 1; and Fig. 3, a view in top perspective of a finished wall member.

Like characters of reference indicate like parts throughout the several views in the drawing.

The invention is most easily carried out by wet casting of concrete in horizontally disposed forms or molds. The usual concrete consisting of cement, aggregate, and water is prepared in the desired proportions and placed in a flat mold 10 in sufficient quantity as to bring the level of the concrete up to within a slight distance below the top edge of the walls of the forms, such as from one-quarter to one-half inch therebelow. The mold is thoroughly vibrated in order to settle the concrete therein so as to bring the upper face of the concrete then in the mold into a flat surface on a horizontal plane. It is to be noted that the concrete is sufficiently wet so as to permit it to be vibrated to this level condition as opposed to the drier concrete mixture employed in power tamping machines.

In the present instance, the wall member 11 being described is that as employed in a silo wherein the thickness would be about two and one-half inches and the width about twelve and one-half inches with any desired length such as two and one-half feet. Preferably the member for this application would be provided with a groove on one side and a tongue on the other for matching when the members are placed one against the other, edge to edge to form the silo.

In a suitable mixing mill, sand is heated to a temperature well above the melting point of the material to be employed as the acid resisting medium. While it is possible to use a number of materials for this purpose, such as asphalt, tars, and paraffin wax, the wax is easily handled, is sufficiently low in price to permit its economical use, and has certain additional qualities as will hereinafter become apparent. For the present example, the acid resisting medium will be referred to as wax. To the heated sand is added the melted wax in the desired proportions. This will depend somewhat upon the size of the individual grains of sand, but in practice one particular proportion is one part by volume of wax to twelve parts of sand. As the wax is mixed through the heated sand, the wax distributes itself throughout the same almost immediately and uniformly with little stirring being required. Approximately two minutes is sufficient to complete the wax coating of the sand.

The sand thus coated and mixed with the wax is then dumped while hot into a revolving drum mixer which has already been charged with unheated water and cement. The resultant mixture of sand, wax, cement and water is churned and mixed for about four minutes until a smooth uniform mortar is obtained.

The resultant mixture is then carried to the mold 10 and poured therein to fill up the mold to its top edges, this top layer being added while the initially poured and settled concrete is still moist and before it has set. The added layer of the sand-wax-cement-water mixture is troweled to a smooth finish and the cement therein bonds this top layer with the concrete thereunder so as to form an integral wall member with no line of cleavage between this thin top layer and the concrete thereunder.

As illustrated more or less diagrammatically in Fig. 2, the upper side of the section is the top side of the member while it is in the mold and is also the inside face of the member when it is positioned in the silo wall. In this section, the major part of the thickness of the wall member is represented by the concrete 12 having the particles of aggregate 13 distributed therethrough and bonded in the usual way by cement. The facing zone is represented by the smaller particles of sand 14 each having a coating of wax 15 therearound with cement 16 flowed therebetween and down into an intimate, integral bond with the concrete 12. It is appreciated that the majority of the particles of sand 14 will not be directly contacted or bonded with the cement therearound but each particle of sand 14 will be separated from that cement by reason of its enveloping film of wax 15. This introduction of films around the sand particles in the facing zone forms the gist of the invention.

Since each particle of sand is isolated from the cement by the film of wax therearound, acids coming into the cement from the face by capillary action do not come into contact with the sand particles. Moreover by reason of the fact that the cement is actually kept separate from the sand particles, the capillaries in this facing zone are extremely small and are easily clogged before the acids can penetrate very far. The wax film about each sand particle, of course, resists any invasion of the acid and moreover, particularly after the silo member has been exposed to the weather through a summer, this film upon becoming heated again will actually tend to spread through the fine capillaries in and about the sand and form a more or less continuous zone of wax through this facing portion so that in time the film of wax becomes somewhat distributed even through the cement intervening between the sand particles. Moreover when the weather becomes cold, the wax tends to shrink at a greater rate than does the sand and cement, but the wax cannot escape and be removed from the facing zone since it is entrapped within the shell-like spaces between the cement and each grain of sand. Therefore, when the weather warms up again, or when the wall members become warmed by the heat transmitted from the fermenting ensilage, the wax is still there and upon expansion will refill that spacing.

In other words, by reason of the unique manner of introducing the wax into the facing zone of the wall member, the wax is not only placed more deeply into the zone than it would be if it were merely painted or spread on the surface, but the wax is placed there in a permanent fashion without danger of being scraped off, cracked off, or otherwise lost.

Referring again to the method forming the individual member, the cast member is left in the mold until it is hardened sufficiently that it may be removed without damage. The removed member is then cured in the usual manner. Incidentally by reason of the presence of the facing surface zone, the water does not evaporate from the member as quickly as it would otherwise and, therefore, good curing conditions are extended in a very beneficial manner.

When it is desirable to employ less water than required in the above indicated procedure, the facing mixture of sand-wax-cement may be "dry-mixed," that is, mixed with a minimum amount of water, and then this "dry-mix" may be placed first in the mold on its pallet or floor and then vibrated at a sufficiently high frequency to level it. Thereafter, the main body of concrete of the usual "wet-mix" may be added to fill the mold, the mold vibrated for a brief period, and then the surface of the concrete smoothed off to complete the casting. This procedure forms the face side down instead of on top as in the procedure first explained.

Also it is to be noted that there is an actual saving of labor in preparing the wall member in the manner stated in that the wax may be introduced into the wall member as described with less labor than it could be by first putting the member through a heating operation and then immersing it in molten wax so that the wax may penetrate the pores or capillaries of the member, as has been done heretofore. While the process has been described in reference to a silo wall member, it is, of course, well adapted to other concrete members such as building blocks and the like where a water resistant surface zone is desirable as well as an acid resisting zone.

While I have herein shown and described my invention in the one particular form, it is entirely obvious that structural changes and method changes may be employed without departing from the spirit of the invention and I, therefore, do not desire to be limited to that precise form beyond the limitations as may be imposed by the following claim.

I claim:

A structural concrete member having a body of cement bonded aggregate normally susceptible to acid and water penetration, and a cement bonded facing zone integrally a part of the member having finely divided aggregate particles each separately embedded in a paraffin wax film, said particles being closely spaced to have a thin envelop of bonding cement therebetween outside of said films, the capillaries of said bonding cement causing spreading of said films under favorable temperature conditions therethrough from one particle to another.

WALTER O. BRASSERT.